United States Patent
Weng et al.

(10) Patent No.: US 8,451,745 B2
(45) Date of Patent: *May 28, 2013

(54) AUTO PROBING ENDPOINTS FOR PERFORMANCE AND FAULT MANAGEMENT

(75) Inventors: Wenwei Weng, Milpitas, CA (US); Minghui Zhu, San Jose, CA (US); Vishnu Kant Varma, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/950,916

(22) Filed: Nov. 19, 2010

(65) Prior Publication Data

US 2011/0063992 A1    Mar. 17, 2011

Related U.S. Application Data

(63) Continuation of application No. 11/559,579, filed on Nov. 14, 2006, now Pat. No. 7,848,337.

(51) Int. Cl.
*H04L 12/58* (2006.01)

(52) U.S. Cl.
USPC ........... 370/252; 370/389; 370/402; 370/404; 709/223; 709/224; 709/225

(58) Field of Classification Search
USPC ................. 370/389, 241, 242, 248, 249, 235, 370/290, 238, 252, 390, 395.4, 400, 401, 370/402, 312, 386, 465; 709/225, 226, 228, 709/229, 232, 234; 345/326, 329, 331
See application file for complete search history.

(56) References Cited

U.S. PATENT DOCUMENTS

| | | | |
|---|---|---|---|
| 6,101,549 A * | 8/2000 | Baugher et al. | 709/238 |
| 7,848,337 B1 | 12/2010 | Weng et al. | |
| 2003/0161265 A1 * | 8/2003 | Cao et al. | 370/229 |
| 2003/0198235 A1 * | 10/2003 | Weldon et al. | 370/401 |
| 2004/0160895 A1 | 8/2004 | Holmgren et al. | |
| 2005/0018647 A1 * | 1/2005 | Lebrun et al. | 370/351 |
| 2005/0063366 A1 * | 3/2005 | Wheeler et al. | 370/352 |
| 2005/0135270 A1 * | 6/2005 | Larsen et al. | 370/254 |

(Continued)

OTHER PUBLICATIONS

U.S. Appl. No. 11/559,579, Notice of Allowance mailed Jul. 26, 2010, 4 pgs.

(Continued)

*Primary Examiner* — Hassan Phillips
*Assistant Examiner* — Anez Ebrahim
(74) *Attorney, Agent, or Firm* — Schwegman, Lundberg & Woessner, P.A.

(57) ABSTRACT

In one embodiment, a method for automatically probing endpoint in a network for performance and fault management is provided. The method may comprise receiving instructions to auto probe endpoints, the instructions comprising probe characteristics and endpoint indicators. The method may further comprise querying an information base to identify endpoints and to obtain information on the identified endpoints that conform to the endpoint indicators. Based on the instructions and the information obtained for the identified endpoints, one or more probe packets may be generating to be transmitted to the identified endpoints. The generated probe packets may further be scheduled for transmission to the identified endpoints. New endpoints may continue to get discovered based on a notification mechanism which exists. Likewise, endpoints leaving the discovery domain may be identified.

20 Claims, 13 Drawing Sheets

U.S. PATENT DOCUMENTS

2006/0182034 A1\* 8/2006 Klinker et al. ............. 370/238
2007/0097991 A1\* 5/2007 Tatman .................. 370/395.53
2008/0229095 A1 9/2008 Kalimuthu et al.

OTHER PUBLICATIONS

U.S. Appl. No. 11/559,579, Non-Final Office Action mailed Feb. 3, 2009, 22 pgs.

U.S. Appl. No. 11/559,579, Non Final Office Action Mailed Aug. 4, 2009, 21 pgs.

U.S. Appl. No. 11/559,579, Response filed Nov. 4, 2009 to Non Final Office Action mailed Aug. 4, 2009, 14 pgs.

U.S. Appl. No. 11/559,579, Response filed May 24, 2010, to Final Office Action mailed Mar. 22, 2010, 12 pgs.

U.S. Appl. No. 11/559,579, Response filed May 4, 2009, to Non Final Office Action mailed Feb. 3, 2009, 10 pgs.

U.S. Appl. No. 11/559,579, Supplemental Notice of Allowability Mailed May 18, 2010, 2 pgs.

U.S. Appl. No. 11/559,579 Final Office Action mailed Mar. 22, 2010, 21 pgs.

\* cited by examiner

AUTO PROBING ENDPOINTS FOR PERFORMANCE AND FAULT MANAGEMENT

CLAIM OF PRIORITY

This application is a continuation of and claims the benefit of priority under 35 U.S.C. §120 to U.S. patent application Ser. No. 11/559,579, filed on Nov. 14, 2006, which is incorporated by reference herein in its entirety.

FIELD

The present disclosure relates generally to auto probing endpoints in an Internet protocol (IP) network, and in example embodiments auto probing endpoints in a Multiprotocol Label Switching (MPLS) virtual private network (VPN) or Ethernet network.

BACKGROUND

IP networks are to perform in a best effort manner and it is therefore essential to monitor network performance and network faults on these networks. For example, network applications may require an IP service provider (ISP) to monitor, as apart of a service level agreement (SLA) between an ISP and a user/client, performance metrics such as data packet loss, round trip time and/or inter-packet jitter (inter-packet latency in arrival time) in a network. The service provider and users/clients therefore need a way to measure network performance metrics thereby to ensure that the agreed level of service is maintained.

For example, an IP SLA is a component of the Internetworking Operating System (IOS) of a network endpoint and functions by provisioning IP SLAs probes in network endpoints, e.g., routers. The probes periodically generate active measurement traffic or probe packets from the source node (e.g., source router) to the destination nodes or network endpoints (e.g., destination routers). The destination endpoints add timestamp data to the measurement traffic and, send the measurement traffic back to the source node. Based on the received measurement traffic, an IP SLA in the source node may report on the performance metrics of the network.

Current methods that are used to measure performance metrics in networks rely on a user configuring probe packets, one by one, to each desired endpoint. This configuration may be done through the use of the Command Line Interface (CLI) or Simple Network Management Protocol (SNMP). As the configuration is manual, it is dependent on the knowledge of the user and the accuracy of the user when configuring the probe packets. Also, when using this configuration, the probe packets may not be able to deal with new network endpoints added to the network or old network endpoints that have failed or fallen away. Due to the evolution of IP networks and with the ever increasing size of such networks the manual configuration has become insufficient and inefficient.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an embodiment of the present invention. It will be evident, however, to one skilled in the art that the present disclosure may be practiced without these specific details.

Overview

A method is provided for auto probing endpoints in a network to enable performance and fault management of the network. The method may comprise receiving instructions to automatically probe endpoints within the network, the instructions comprising probe characteristics and endpoint indicators. The method may further comprise querying an information base to identify endpoints and to obtain information on the identified endpoints that conform to the endpoint indicators and, based on the instructions and the information obtained for the identified endpoints, generate one or more probe packets to be transmitted to the plurality of endpoints. The method may also comprise scheduling the transmission of the one or more probe packets to the identified endpoints.

Example Embodiments

Auto probing of endpoints in a network is described in the present disclosure.

Figure 1:
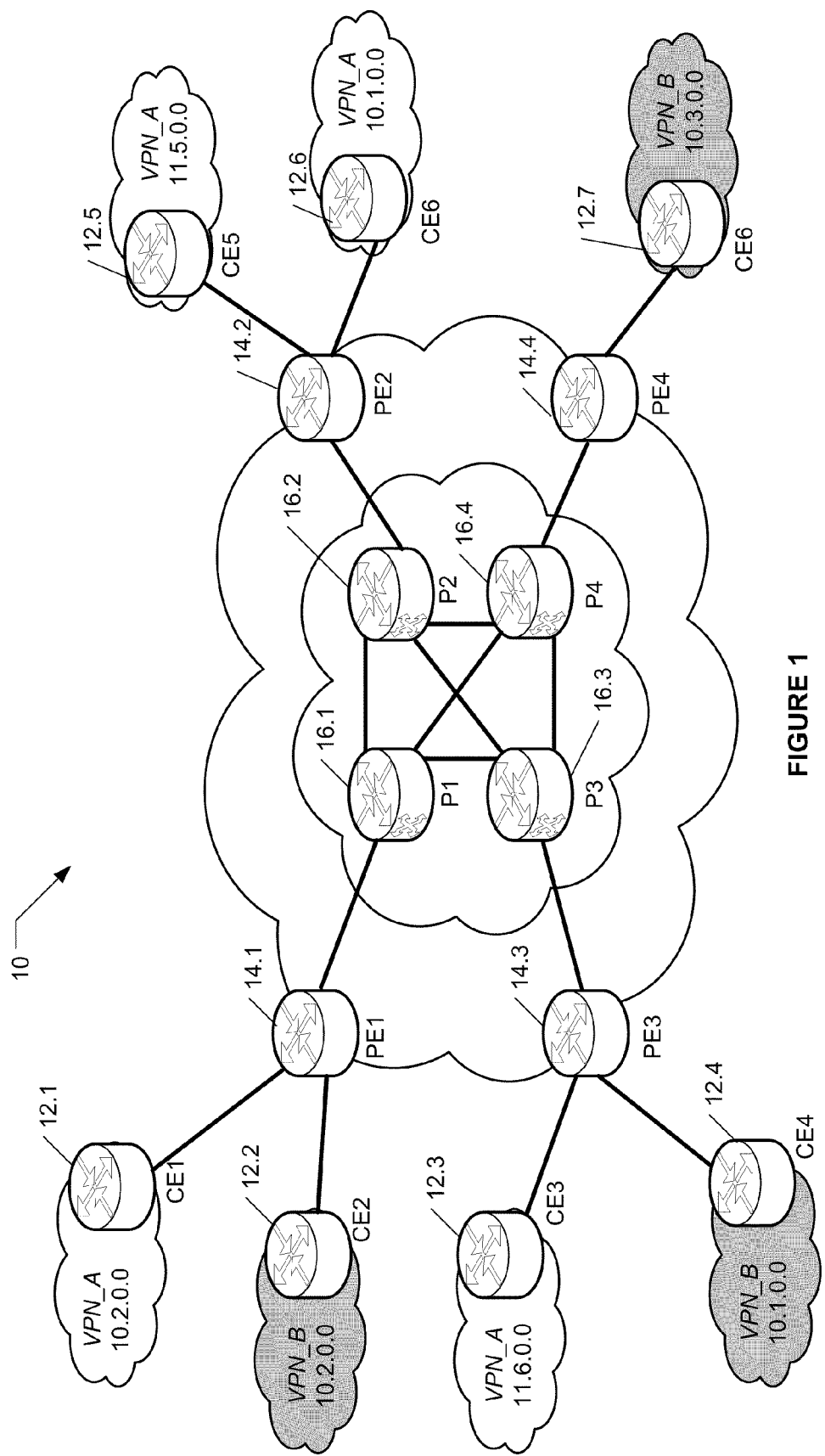
FIG. 1 shows an example of a system in which endpoints are auto probed for performance and fault management in a Multiprotocol Label Switching (MPLS) virtual private network (VPN) network, in accordance with an example embodiment.

In one example embodiment, shown in FIG. 1, an IP network comprising multiple virtual private networks (VPNs) using Multiprotocol Label Switching (MPLS) is described. In this example network a performance management module, e.g., a Cisco IP Service Level Agreement (SLA), on a source node, e.g., a provider edge router, may identify multiple endpoints, e.g., other provider edge routers, and may automatically generate, configure and schedule probe packets to be transmitted from the source node to the endpoints. This process may facilitate performance and fault management on the MPLS VPN network.

Figure 2:
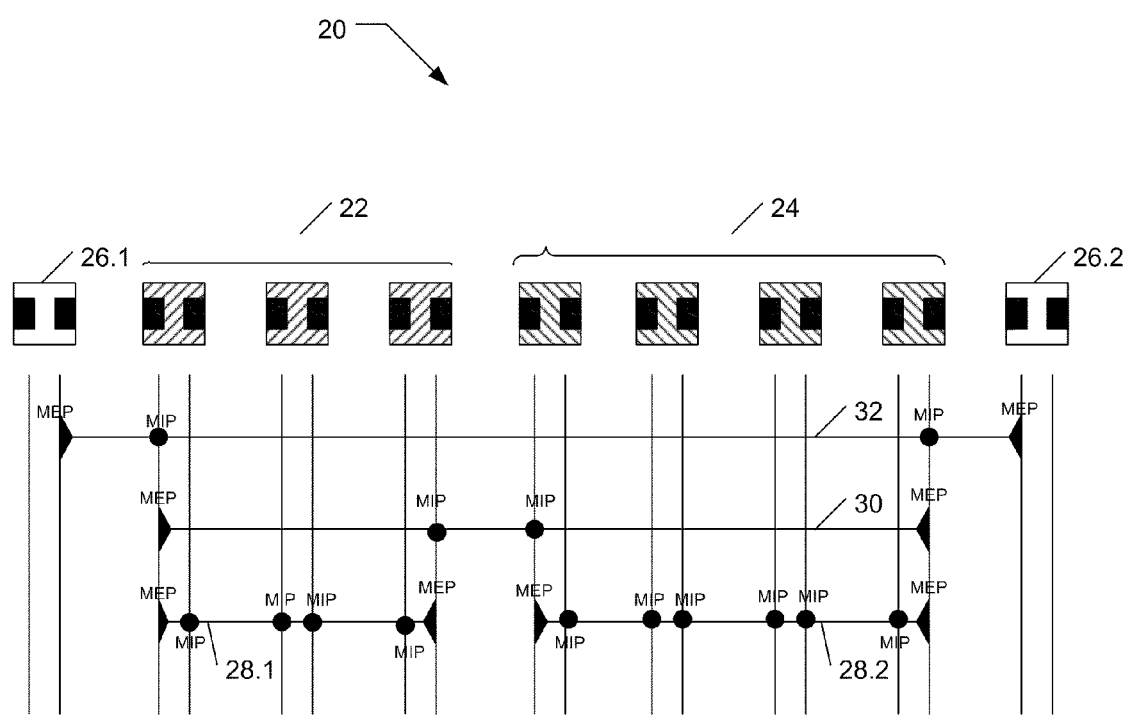
FIG. 2 shows another example of a system in which endpoints are auto probed for performance and fault management in an Ethernet network environment, in accordance with an example embodiment.
Figure 3:
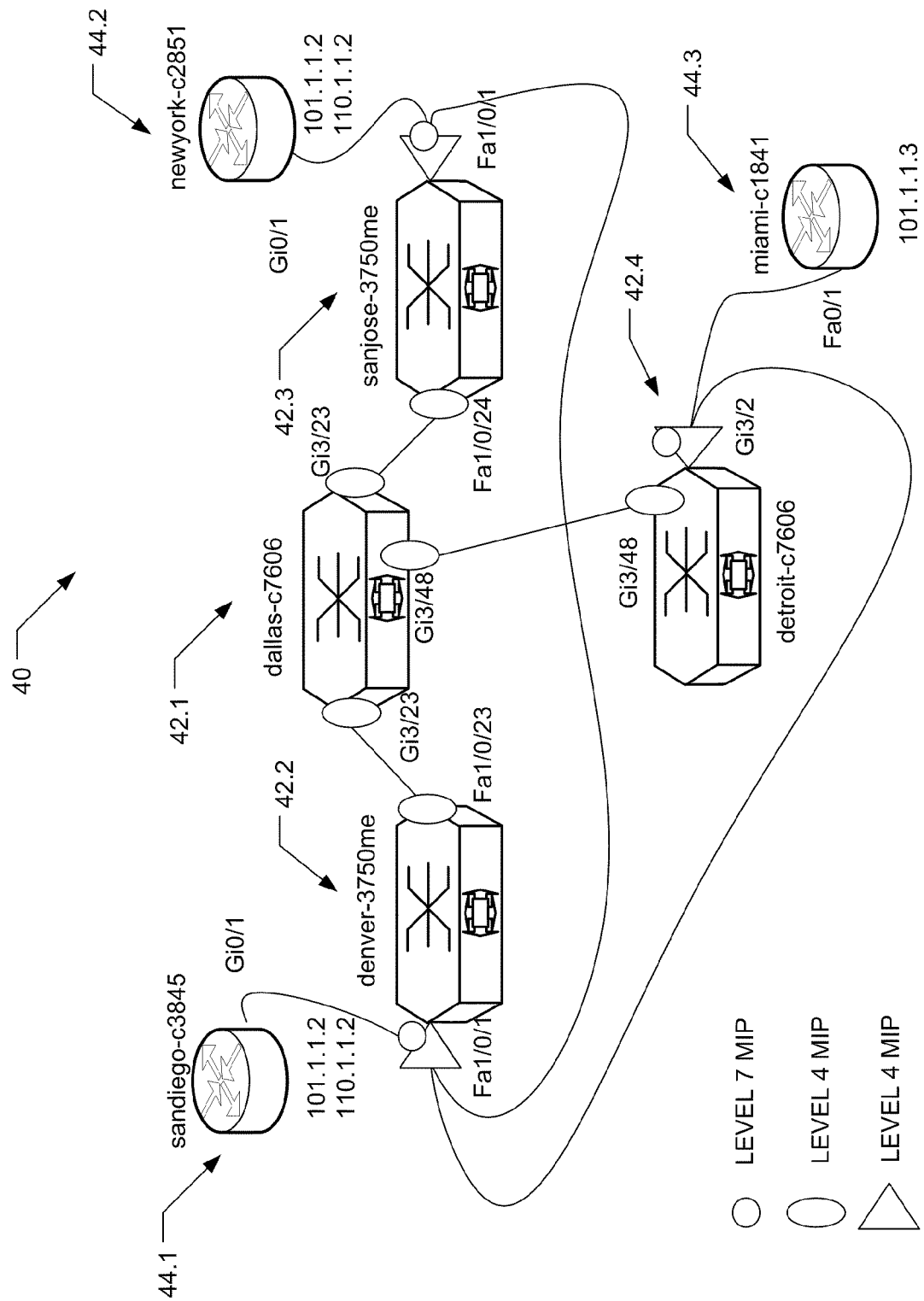
FIG. 3 shows an example topology of an Ethernet environment in accordance with an example embodiment.

In other example embodiments, shown in FIGS. 2 and 3, an Ethernet comprising multiple Ethernet Operation and Management (OAM) endpoints is described. In these networks a performance management module, e.g., a Cisco IP Service Level Agreement (SLA), on one of the Ethernet endpoints may identify multiple other Ethernet endpoints in a particular virtual local area network (VLAN) and domain. e.g., endpoint routers. The performance management module may automatically generate and schedule probe packets to be transmitted from the one endpoint to the other endpoints, thereby to facilitate performance and fault management in the Ethernet environment. Although the IP layer of the network is not probed in the example embodiment of the Ethernet, the IP network of FIG. 1 and the Ethernets of FIGS. 2 and 3 may operate in a similar fashion.

It will be appreciated that, irrespective of the example embodiments described below, the present disclosure may find application in various types of IP network making use of different protocols.

Referring to FIG. 1, reference numeral 10 generally indicates a system, in accordance with an example embodiment, in which endpoints are auto probed for performance and fault management in an IP network comprising multiple VPNs. The IP network is shown by way of example to use MPLS.

MPLS is a data-carrying mechanism operating on the OSI model layer and was designed to provide a unified data-carrying service to both circuit-based clients and packet-switching clients. In MPLS each data packet to be transmitted across the network is prepended with an MPLS header, which may contain one or more "labels". This allows MPLS the ability to support various service models and to manage traffic aver the network.

Exit points of an MPLS network may be called Label Edge Routers (LER).

In the event that an unlabeled packet enters an MPLS network at an entry router, the router may determine where to forward the packet and may then insert one or more labels in the packet's newly created MPLS header. The packet may then be passed to a next hop router. If the next hop router is not an exit point, the router need not examine the content of the packet, and may merely forward the packet to the next hop muter, based on the label in the MPLS header.

Once the packet reaches an exit point muter, the router may remove the label of the data packet thereby to leave only the payload of the packet. By using the payload, the exit point router may forward the packet to its destination with the use of a label lookup table.

In an example embodiment, the system 10 may comprise multiple client endpoints or client edge routers 12.1 to 12.7 connected to network endpoints, e.g., provider edge routers 14.1 to 14.4. The provider edge routers 14.1 to 14.4 may, as explained above, be regarded as Label Edge Routers (LER) in the MPLS network.

Each of the provider edge routers 14.1 to 14.4 is interconnected by way of example to intermediate network nodes 16.1 to 1.64, thereby forming the MPLS network. The intermediate network nodes 16.1 to 16.4 may also be routers, switches, or the like.

As shown in FIG. 1, the network 10 may comprise VPN_A extending between client edge routers CE1 12.1, CE3 12.3, CE5 12.5 and CE6 12.6. The network may further comprise VPN_B extending between client edge routers CE2 12.2, CE4 12.4 and CE7 12.7.

The MPLS VPN network 10 may be configured for virtual routing and forwarding (VRF) which is a technology that allows for multiple instances of a multiple routing table to co-exist within a single router at the same time. VRF may, for example, be implemented in a router by having distinct routing tables for each VRF, e.g., VPN_A and VPN_B.

As the routing instances are independent, an overlap of IP addresses may be acceptable as a conflict need not occur. For example, and as shown in FIG. 1, the IP address of both client edge router CE1 12.1 and client edge router CE2 12.2 may be 10.2.0.0.

Client edge routers CE1 12.1 and CE2 12.2 may be connected to the network via provider edge router PE1 14.1, while client edge routers CE3 12.3 and CE4 12.4 may be connected to the network via provider edge router PE3 14.3. Similarly, client edge routers CE5 12.5 and CE6 12.6 may be connected to the network via provider edge router PE2 14.2, while client edge router CE7 12.7 may be connected to the network via provider edge router PE4 14.4.

The provider edge router PE1 14.1 may be connected to the intermediate router P1 16.1 (e.g., next hop router) which may be connected to the other intermediate router P2 16.2, P3 16.3 and P4 16.4. In turn, each of the intermediate routers P2 16.2, P3 16.3 and P4 16.4 may respectively be connected to provider edge routers PE2 14.2, PE3 14.3 and PE4 14.4.

To facilitate performance and fault management, any one of the provider edge routers 14.1 to 14.4 may, in an example embodiment, operate as a source node and may automatically generate and schedule probe packets. These probe packets may be transmitted to the other provider edge routers which may be deemed to be endpoints of the source node. For example, provider edge router PE1 14.1 may automatically generate and schedule probe packets to assess the network performance and may transmit these probe packets to endpoints in the network, e.g., provider edge routers PE2 14.2, PE3 14.3 and PE4 14.4.

As will be described in more detail below, an information base listing all endpoints (e.g., other provider edge routers) in a network may be maintained in each of the provider edge routers 14.1 to 14.4. This information base may have various routing tables, for example, the Interior Border Gateway Protocol (IBGP) address table of the router. In a VRF embodiment, various distinct routing tables may be maintained for each VRF VPN.

In another example embodiment, with reference now to FIG. 2, a system 20 in which endpoints are auto probed for performance and fault management in an Ethernet network environment is shown.

FIG. 2 shows the various levels which may exist in a given Ethernet domain, and each level may have various endpoints (e.g., maintenance endpoints or MEPs) and intermediate points or nodes (e.g. maintenance intermediate points (MIPs). The maintenance intermediate points may be owned by independent operators and may be leased by service providers. Maintenance endpoints may belong to service providers and, from the description below, it will be evident that a maintenance intermediate point for a service may be a maintenance endpoint for an operator. As maintenance endpoints lie at the edge of a domain, the maintenance endpoints may actively source connectivity fault management (CFM) messages.

For example, operator A bridges 22 and operator B bridges 24 may connect customer equipment 26.1 and 26.2. Operator A bridges 22 and operator B bridges 24 may comprise either routers or switches.

On operator level 28.1 (associated with operator A) there may accordingly be two maintenance endpoints (MEPs) for operator A, with four maintenance intermediate points (MIPs) connecting the two MEPs. Similarly, on operator level 28.2 (associated with operator B) there may be two maintenance endpoints (MEPs), with six maintenance intermediate points (MIPs) connecting the MEPs.

On the provider level 30 there may also be two maintenance endpoints (MEPs) and two maintenance intermediate points (MIPs).

Similarly, on the customer level 32 there may be two maintenance endpoints (MEPs) and two maintenance intermediate points (MIPs).

It should follow that in order to facilitate performance and fault management in this example Ethernet environment, automatic (auto) probing may be conducted between any of the associated endpoints on each level.

In FIG. 3, an example topology of an Ethernet environment 40 is shown. Various local networks, e.g., the virtual local area networks (VLANS) 42.1 to 42.4, are connected by various routers, thereby to form an Ethernet to which client networks 44.1 to 44.3 may be connected. The VLANs 42.1 to 42.4 and client networks 44.1 to 44.3 may be identified by their respective MAC addresses. As indicated by FIG. 2, various maintenance endpoints may exist on different layers, between the different domains or VLANS 42.1 to 42.4.

Figure 4:
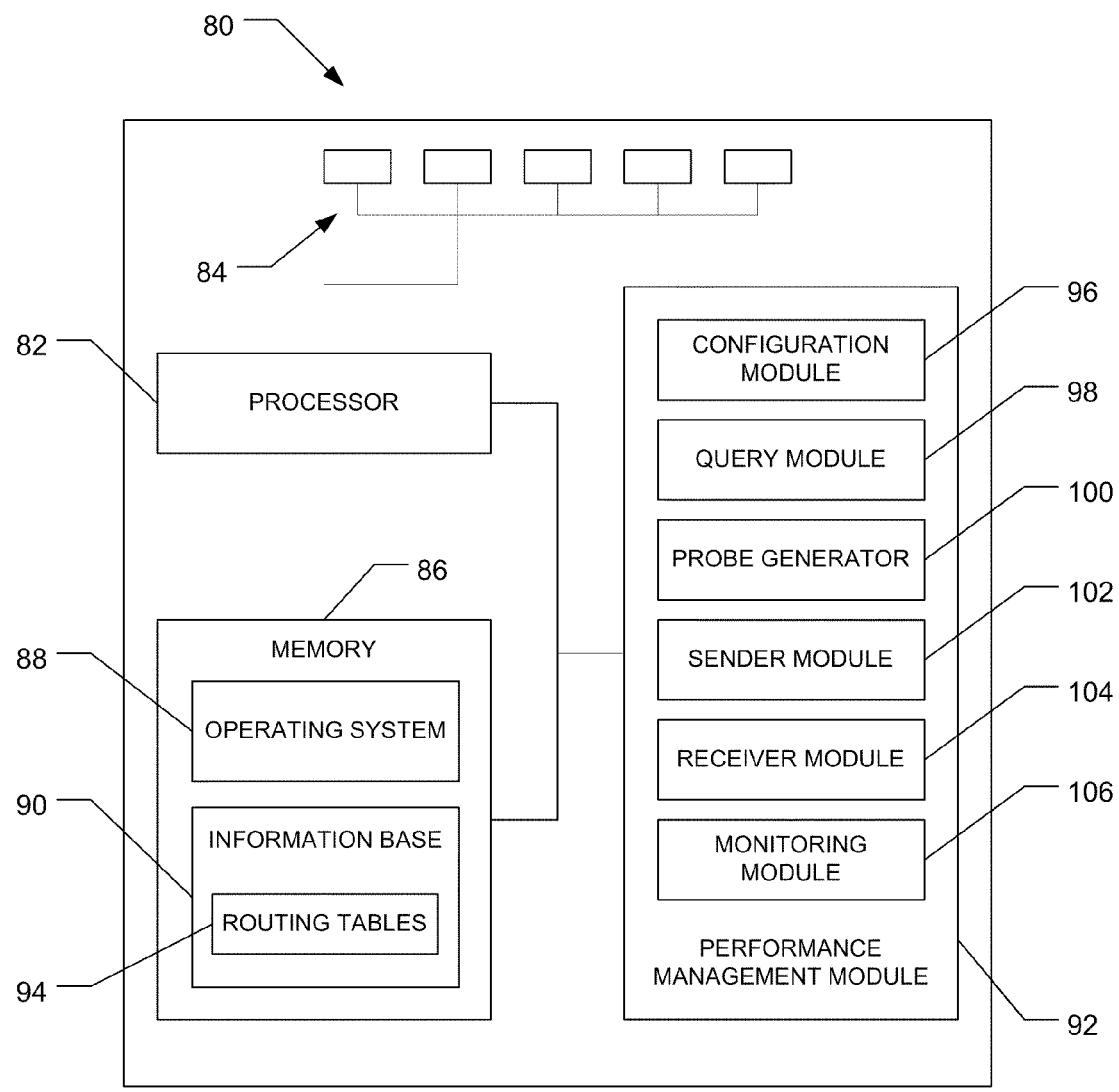
FIG. 4 shows an example network node, e.g., a router, to auto any probe endpoints shown in FIGS. 1 to 3 for performance and fault management, in accordance with an example embodiment.

FIG. 4 shows an example apparatus 80, in accordance with an example embodiment, that may be used to auto probe the endpoints shown in FIG. 1 or 2 for performance and fault management.

In an example embodiment, the apparatus 80 may be, or part of, one of the provider edge routers 14.1 to 14.4 configured to operate as routers in the MPLS VPN network of FIG. 1. Alternatively, the apparatus 80 may be an Ethernet endpoint, e.g., an Ethernet router, configured to operate as a maintenance endpoint (MEP) in the Ethernet network environment as shown in FIGS. 2 and 3. It will be appreciated that the apparatus 80 may be adapted and configured to operate as a source node (which may be an endpoint for other nodes) in other types of IP networks using various protocols.

The apparatus 80 may comprise at least one processor 82 connected to a plurality of interfaces 84 that input (Rx) and output (Tx) traffic, in the form of various types of packets, within a network (e.g., the network as shown in FIG. 1 to FIG. 3). The interfaces 84 may be joined by an interconnect fabric (not shown) such as, e.g., a crossbar interconnection switch or high-speed bus. Those skilled in the art will recognize that other router platforms such as, e.g., a uniprocessor system or a plurality of independent nodes interconnected via a communications fabric as a multi-node cluster, could be used. In this context, the term "node" denotes a computer or processor complex comprising processors and an independent memory shared by the processors.

The processor 82 may have a dedicated memory 86 which may comprise storage locations addressable by the processor 82 for storing software programs and data structures associated with auto probing endpoints in a network. The processor 82 may comprise processing elements or logic for executing the software programs and manipulating the data structures.

An operating system 88, e.g., an Internetwork Operating system (IOS), portions of which may be resident in the memory 86 and executed by the processor 82, may functionally organize the apparatus 80 by, inter alia, invoking network operations in support of software processes executing on the processor 82. These software processes may include, amongst others, an information base 90 and a performance management module 92. It will be apparent to those skilled in the art that other processor and memory means, including various computer readable media, may be used for storing and executing program instructions pertaining to the disclosure.

An underlying topology-gathering protocol may populate one or more routing tables 94 of the information base 90. In an example embodiment, e.g., a provider edge router 14.1 to 14.4 in the MPLS VPN network 10 of FIG. 1, the routing table 94 may be the IBGP address table of the router or may be various distinct VRF routing tables.

In the Ethernet example embodiments of FIGS. 2 and 3, the routing table 94 of the information base 90 may be kept up to date by a connectivity fault management (CFM) manager that may maintain a database of endpoints.

The CFM manager may be defined by IEEE 802.1ag and may allow for the discovery and verification of paths through 802.1 bridges and LANs. The CFM manager may further define maintenance domains, relationships between maintenance domains, may describe protocols and procedures used by maintenance points to maintain and diagnose connectivity faults within a maintenance domain and may provide means for future expansion of capabilities of maintenance points and their protocols.

The one or more routing tables 94 of the information base 90 may be updated continuously. For example, the one or more routing tables 94 may be updated as soon as a router detects that a new endpoint has been added to the network, or as soon as the router detects that an endpoint fails or falls away. In these circumstances, the information base 90 may respectively add the new endpoint and its associated information to the one or more routing tables 94 or may delete the endpoint from the one or more routing tables 94.

In an example embodiment, the performance management module 92 may comprise a configuration module 96 to receive instructions to auto probe endpoints within a network, any of the provider edge routers 14.1 to 14.4 of the MPLS VPN network 10 of FIG. 1 or any of the routers of the Ethernet network of FIGS. 2 and 3, thereby to obtain network performance data.

These instructions may be generated through a Command Line Interface (CLI) or Simple Network Management Protocol (SNMP) component, which may be used to configure the performance management module 92 for a particular VRF, which may be specified by the instructions. The CLI or SNMP component may also be used to obtain the specific configuration of the performance management module 94 or to reset the performance management module 94.

The instructions to configure the performance management module 92 may include probe characteristics and endpoint indicators. For example, the probe characteristics may include the following parameters of the probes to be generated: type of probe, frequency, age-out, time-out, request-data-size, EXP bits, threshold and trap and trigger configurations. The type of probe operations that may be configured are echo, pathEcho, jitter and pathJitter.

The echo operation may use Label Switched Path (LSP) ping infrastructure to perform operations over the MPLS network. The pathEcho operation may use a LSP trace algorithm to trace a path from the source node to an endpoint. For each hop in the path, path echo operations may be performed. For jitter operations a UDP packet may be constructed and may be sent to an endpoint. The responder should be intelligent enough to distinguish this packet and respond to this packet accordingly. PathJitter operations may be similar to pathEcho operation, although the number of packets that may be sent to a particular hop node may be more than one and the calculation of the performance metrics would be different.

The endpoint indicators may include parameters to specify the VRF name (e.g., VPN_A or VPN_B) for which endpoints need to be identified.

In the Ethernet example of FIGS. 2 and 3, the instructions may need to include endpoint indicators which may be parameters to specify the domain and the VLAN identification for which Ethernet endpoints need to be identified. The probe characteristics of the instructions may also include parameters to identify the type of probe operation to be performed by the performance management module 94, as well as other scheduling parameters, such as start-time, life, frequency etc. The type or probe operations may include Ethernet-jitter control frame, Ethernet-jitter control acknowledgement frame, Ethernet-jitter data frame and 802.1ag defined loopback frame.

The performance management module 92 may further comprise a query module 98 to query the information base 90, e.g., the one or more routing tables 94 of the information base 90, thereby to identify endpoints relating to and associated with the apparatus 80 and also to obtain information on the identified endpoints that conform to the endpoint indicators. As mentioned, the endpoint indicators may specify the VRF name or domain and/or VLAN of endpoints to be identified.

For example, in the example embodiment of FIG. 1, "vrf VPN_B" may be specified by instructions received by the performance management module 92 of provider edge router PE1 14.1. When the query module 98 of this router queries the relevant routing table 94, the provider edge routers of VPN_B endpoints may be identified, e.g. provider edge router PE3 14.3 which is connected to client edge router CE3 12.4 (VPN_B, 10.1.0.0) and provider edge router PE4 14.4 which is connected to client edge router CE7 12.7 (VPN_B, 10.3.0.0).

As shown in the example embodiment of FIG. 4, the performance management module 92 may also include a probe generator 100 to generate, configure and schedule one or more probe packets. The probe packets may be generated, configured and scheduled based on the instructions received by the configuration module 96 and the information on the identified endpoints obtained from the information base 90. The probe generator 100 may also adjust the generated one or more probe packets, should an update notification message be received, as is discussed in more detail below.

A sender module 102 and receiver module 104 may also form part of the performance management module 92. The sender module 102 may transmit the one or more generated probe packets to the identified endpoints. The receiver module 104 may receive performance probe packets back from the endpoints. The transmission of the generated probe packets and the receipt of the performance probe packets are used to assess network performance. It will be appreciated that each endpoint may also include a sender module and a receiver module. The receiver module may receive the generated probe packet, while the sender module may send the performance probe packet back to apparatus 80.

The performance management module 92 may measure the network performance data based on the performance probe packets received from the different endpoints. In order to measure network performance, e.g., to allow for performance and fault management, the probe packets to be transmitted by the sender module 102 may be time-stamped, while the performance probe packets may also be time-stamped at the endpoints, before being returned to the source node or source provider edge router. The probe packets may, for example, be Internet Control Message Protocol (ICMP) echo request packets that are transmitted to the endpoints. The receiver module 104 may then listen for ICMP echo response replies. By using time-stamp data, interval timing, response rates and other data forming part of the performance probe packets, data packet loss, round trip time, inter-packet jitter and other performance information may be obtained.

In an example embodiment, a monitoring module 106 of the performance management module 92 may receive an update notification. The update notification may notify the performance management module 92 that the identified endpoints conforming to the endpoint indicators have changed. This notification may be received from the information base 90 and may be communicated to the monitoring module 106 by the processor 82.

As mentioned, once an update notification has been received, the probe generator 100 may adjust the one or more probe packets that are still to be transmitted to the plurality of endpoints based on the update notification. For example, if the update notification notifies that an identified endpoint has failed or fallen away, the probe generator 100 may remove or delete the scheduled probes that were destined for the particular endpoint. Similarly, if the update notification notifies the performance management module 92 that a new endpoint that conforms to the endpoint indicators has been identified, additional probes may be generated and may be transmitted to the particular endpoint.

In an example embodiment, the performance management module may be controlled by the processor 82.

Figure 5:
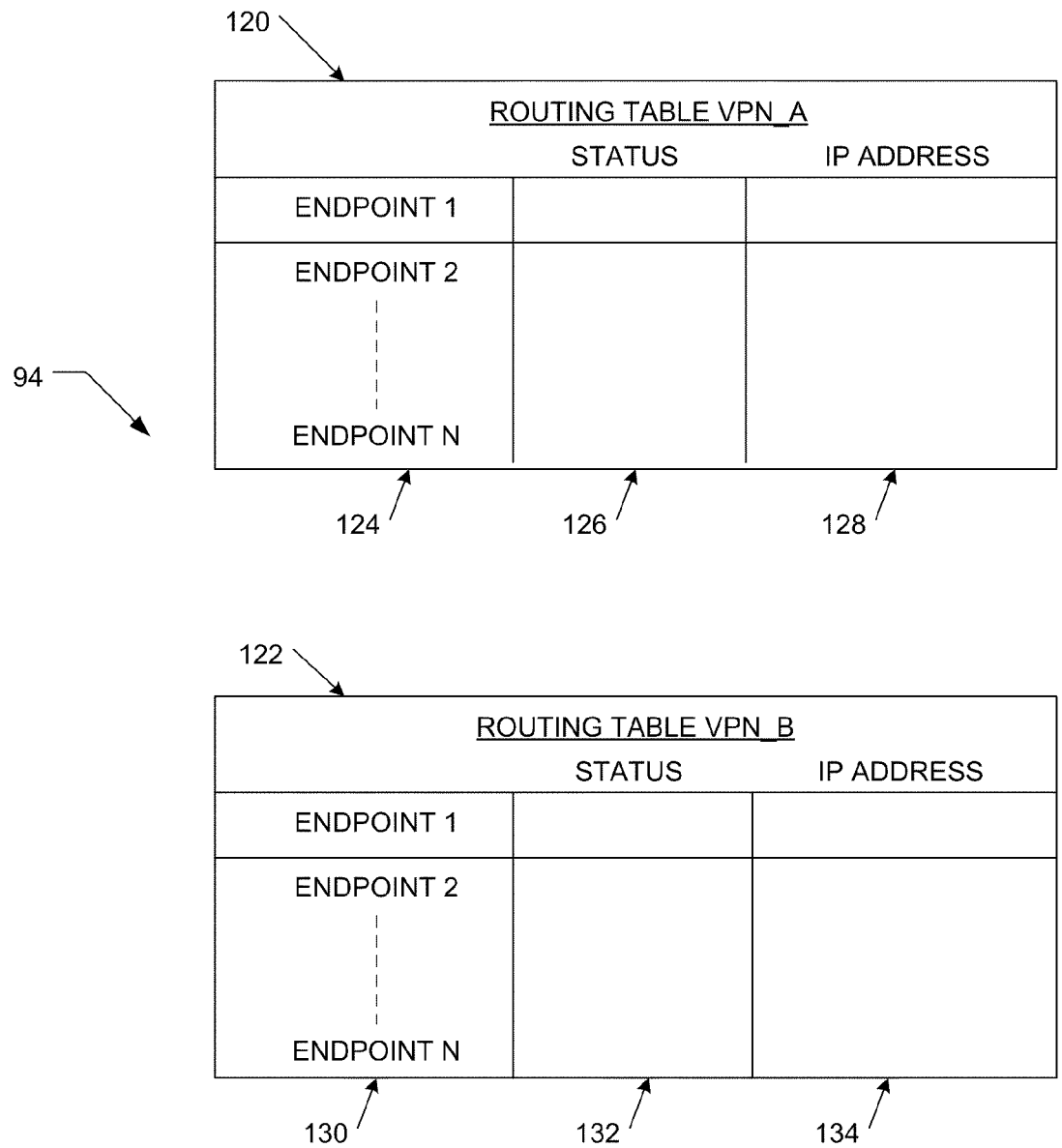
FIG. 5 shows an example of an information base that may be maintained within a memory of the network node of FIG. 4, in accordance with an example embodiment.

Turning now to FIG. 5, an example one or more routing tables 94 are shown, in accordance with an example embodiment. The one or more routing tables 94 comprise a routing table 120 for a first VRF, e.g., VPN_A, and a routing table 122 for a second VRF, e.g., VPN_B. These two routing tables may form part of the information base 96 which may be maintained in the memory 86 of the apparatus 80.

The routing table 120 for VPN_A may comprise a list of the endpoints 124 in VPN_A to which the apparatus 80 may be connected. The routing data table 94 may further include status indicators 126 for each of the endpoints 124 and a list of each of the IP addresses 128 for the endpoints 124.

Similarly, the routing table 122 for VPN_B may comprise a list of the endpoints 130 in VPN_B to which the apparatus 80 may be connected. The routing data table 122 may further include status indicators 132 for each of the endpoints 130 and a list of each of the IP addresses 134 for the endpoints 130.

It will be appreciated that the one or more routing table 94 may differ according to the network application and protocols used in the networks. For example, for an apparatus operating in an Ethernet environment, the one or more routing tables may include a list of the domain and/or VLANs to which each of the endpoints 124 belongs.

Figure 6:
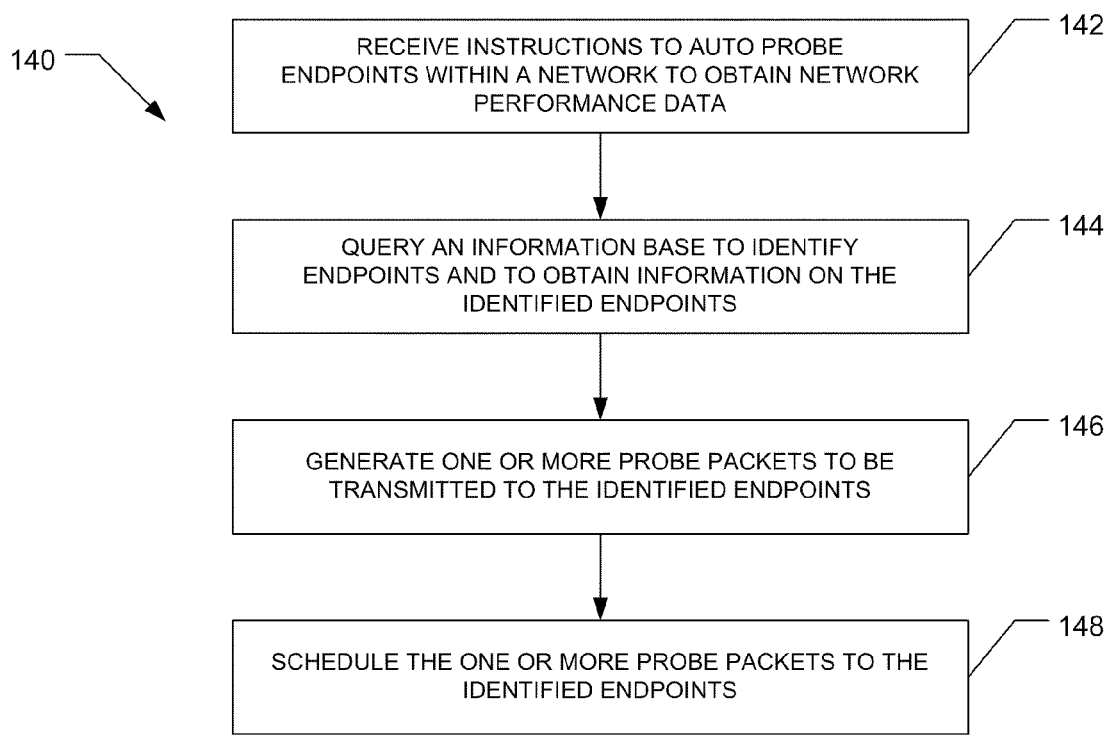
FIG. 6 shows a flow diagram of an example method for auto probing endpoints in a network, thereby to enable performance and fault management, in accordance with an example embodiment.

FIG. 6 shows a flow diagram of a method 140, in accordance with an example embodiment, for auto probing endpoints in a network, thereby to enable performance and fault management. In an example embodiment, the method may be implemented by any one of the endpoints, e.g. the provider edge routers 14.1 to 14.4 of the system 10 of FIG. 1. Alternatively, in an example embodiment, the method 140 may be implemented by any one of the endpoints of the Ethernet network 40 of FIGS. 2 and 3.

As shown by block 142, a configuration module 96 of a performance management module 92 may receive instructions to auto probe endpoints within a network to obtain network performance data. The instructions may comprise probe characteristics (e.g., the mentioned parameters type of probe, frequency, age-out, timeout, request-data-size, EXP bits, threshold and trap and trigger configuration) and endpoint, indicators (e.g., a particular VRF or domain and/or VLAN for which endpoints need to be probed).

Figure 8:
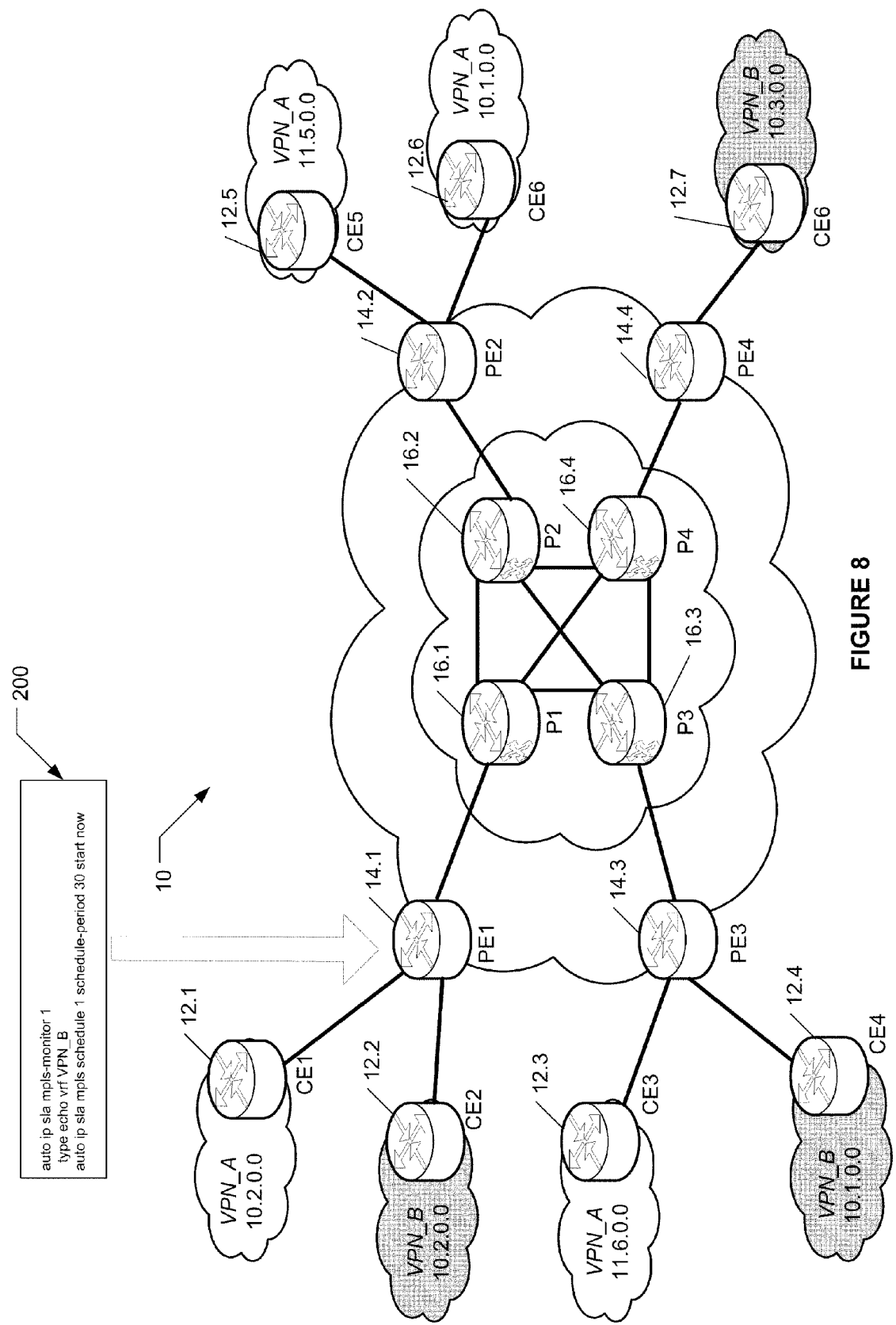
FIGS. 8 to 12 show the system of FIG. 1 wherein various operations of the methods of FIGS. 6 and 7 are illustrated.

For example, as shown in an example embodiment of FIG. 8, provider edge router PE1 14.1 may receive instructions 200, which may be from a CLI or SNMP. In an example embodiment, the instructions may first be processed by the processor 82 of the apparatus 80. The instructions, as shown in FIG. 8, prompt the performance management module 92 to identify all endpoints relating to VPN_B.

A query module 98 may now query an information base 90 to identify endpoints and to obtain information on the identified endpoints that conform to the endpoint indicators (as shown by block 144 of FIG. 6). For example, based on the instructions received, the query module 98 may query the information base 90 to only identify endpoints in the information base 90 that form part of a specified VRF to be probed. The information of the endpoints that may be obtained by the query module 98 is, for example, an endpoint address (e.g., IP or MAC address, depending on the network configuration). It is however to be noted that the methods described herein may utilize any protocol (e.g., to identify endpoints).

Figure 9:
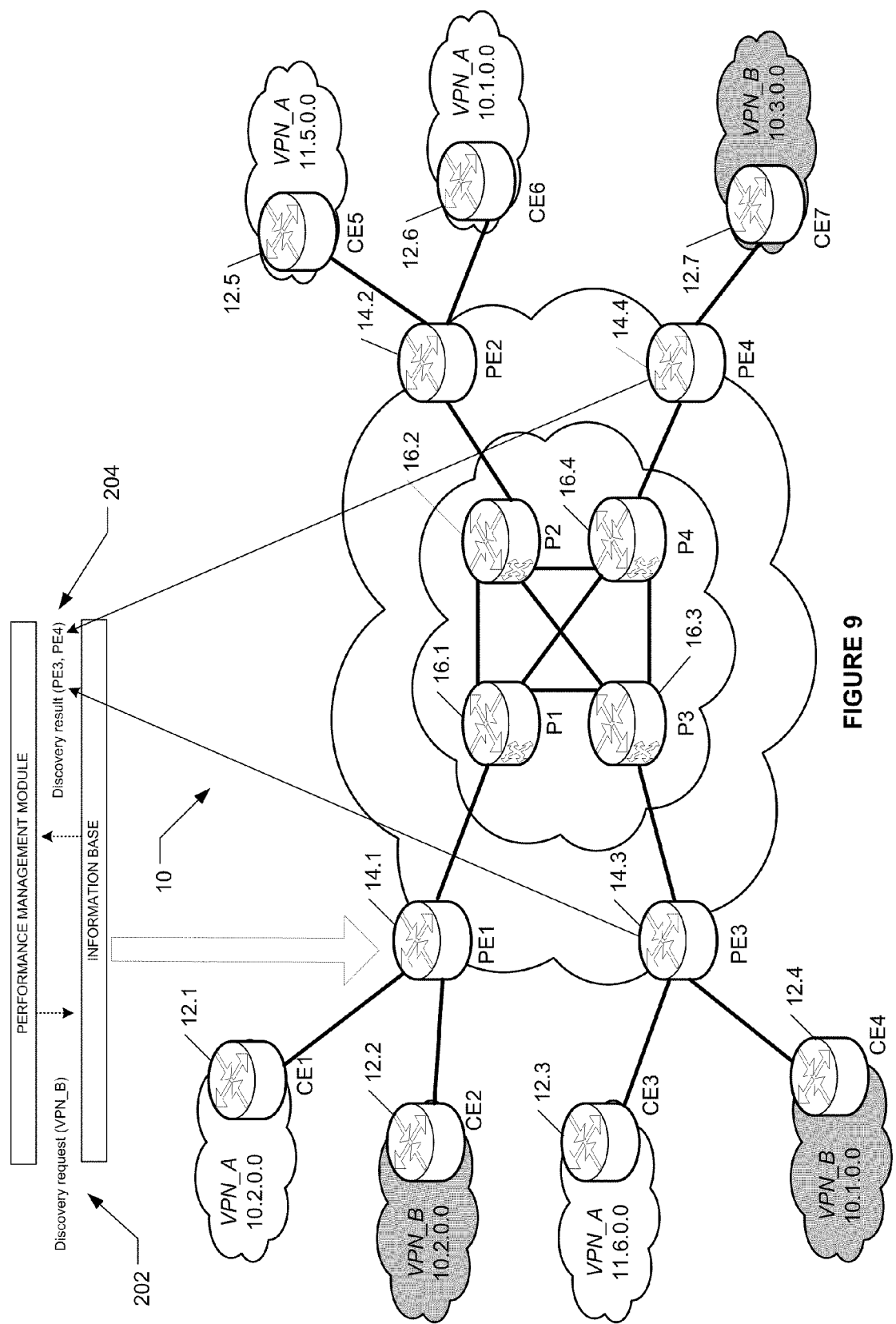

Turning to an example embodiment of FIG. 9, the performance management module 92 of the provider edge router PE1 14.1 is shown to query its information base 90 (indicated by arrow 202) and is shown to identify the two endpoints (provider edge router PE3 14.3 and provider edge router PE4 14.4) as endpoints for VPN_B. This identification is indicated by arrow 204.

As indicated by block 146, a probe generator 100 may (e.g., automatically) generate and configure one or more probe packets to be transmitted to the identified endpoints. The probe packets may be generated based on the instructions obtained by the configuration module 96. The generation of the probe packets may also be dependent on the information obtained from the information base 90, as the endpoint identifiers are necessary to transmit the probe packets to the relevant endpoints.

Figure 10:
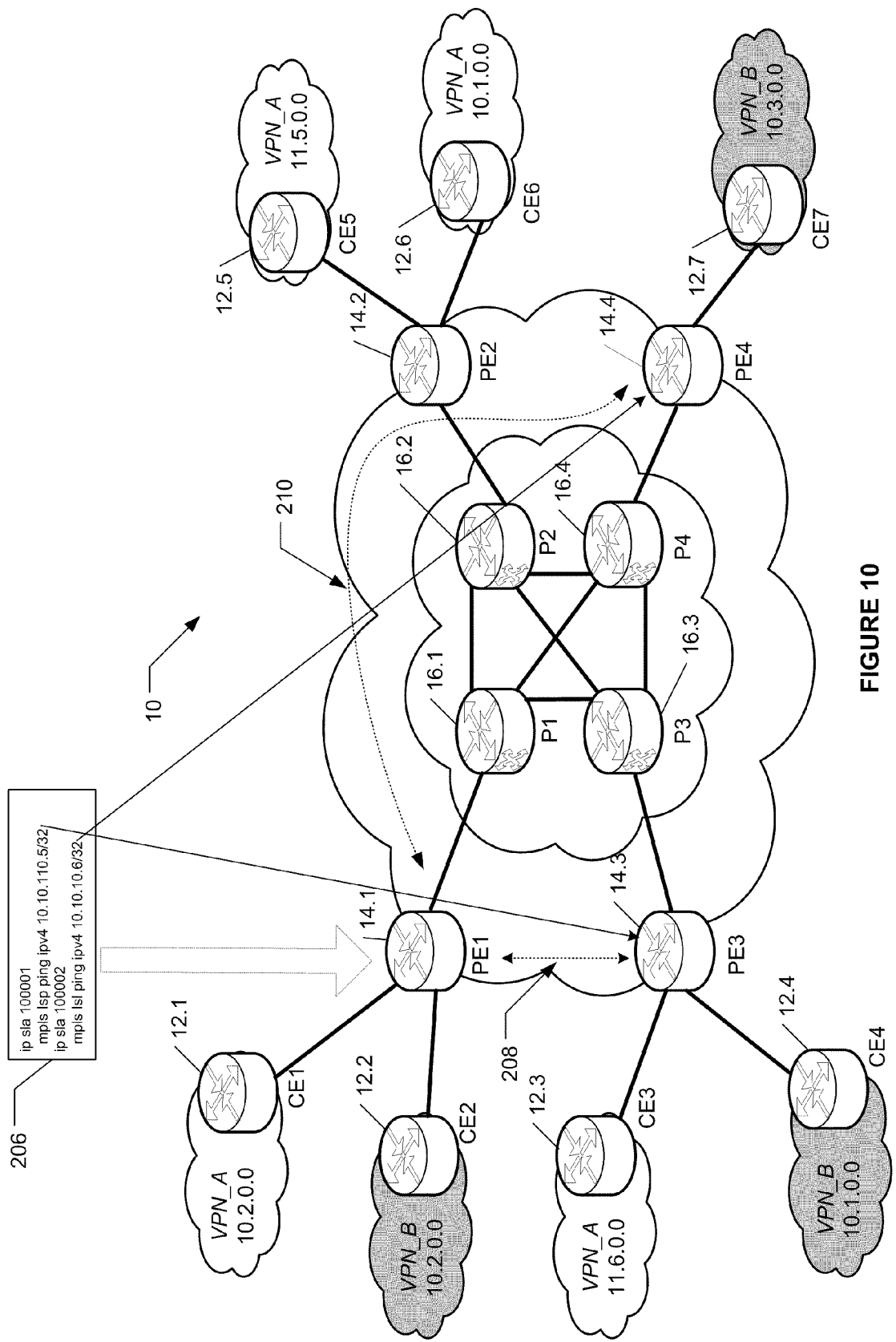

As shown in an example embodiment of FIG. 10, the probe generator 100 may automatically generate the probe packets indicated by arrow 206.

The generated probe packets may now be automatically scheduled (shown by block 148) according to the scheduling parameters that may have formed part of the probe characteristics of the received instructions.

Returning to the example embodiment of FIG. 10, the probe generator 100 may schedule the two generated probes to be respectively transmitted to provider edge router PE3 14.3 and provider edge router PE4 14. Arrow 208 indicates the proposed transmission of the first probe packet to provider edge router PE3 14.3, while arrow 210 indicates the proposed transmission of the first probe packet to provider edge router PE4 14.4.

Figure 7:
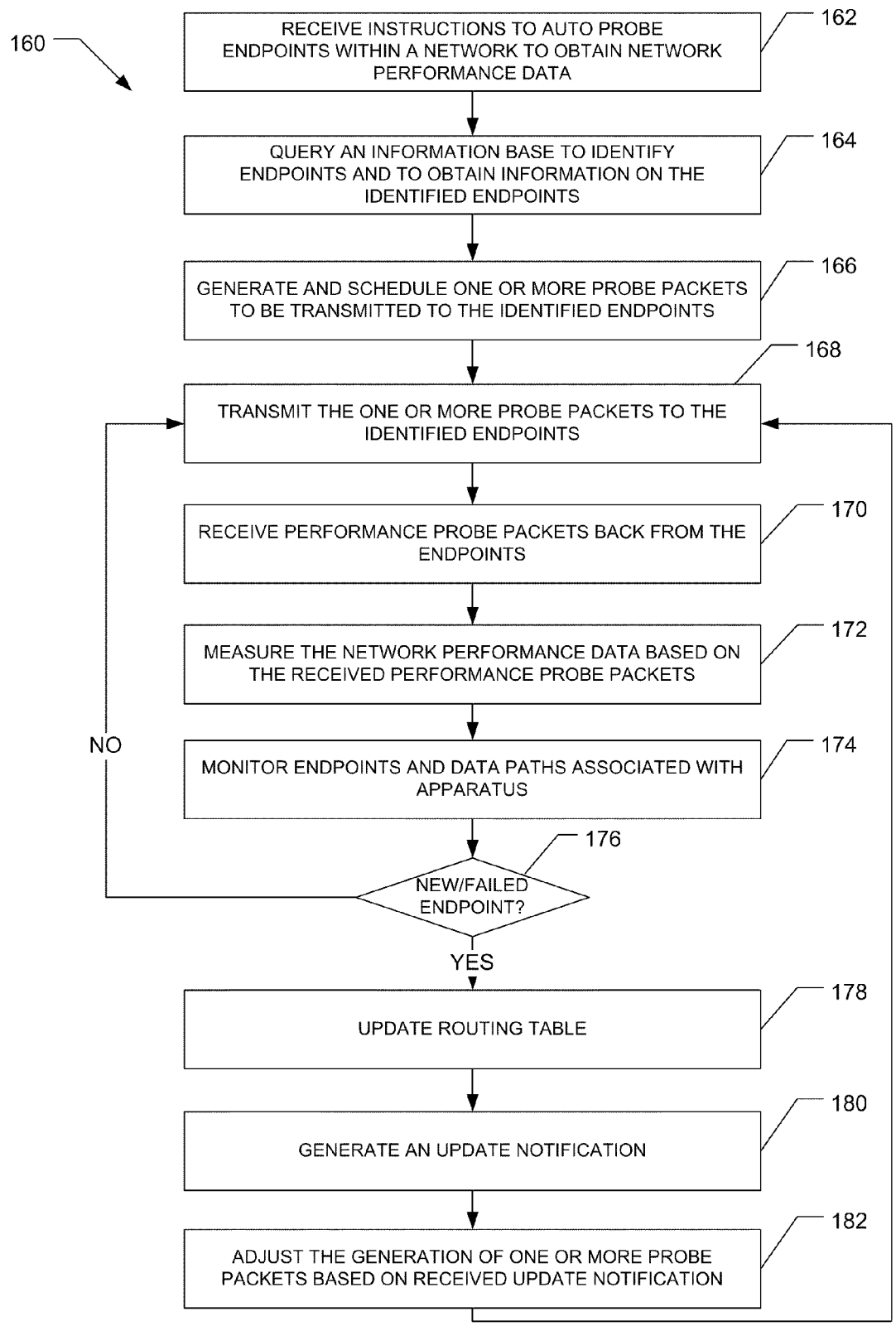
FIG. 7 shows a flow diagram of an example method of auto probing endpoints in a network, thereby to enable performance and fault management, in accordance with an example embodiment.

FIG. 7 shows a flow diagram 160 of a more detailed example embodiment of a method auto probing endpoints in a network to enable performance and fault management, in accordance with an example embodiment. In an example embodiment, the method 160 may be implemented by any one of the endpoints of either the system 10 of FIG. 1 or the Ethernet 40 of FIGS. 2 and 3.

Similar to the description according to FIG. 6, in block 162 of FIG. 7, a configuration module 96 of a performance management module 92 is shown to receive instructions to auto probe endpoints within a network to obtain network performance data. The instructions may comprise probe characteristics (e.g., the mentioned parameters type of probe, frequency, age-out, timeout, request-data-size, EXP bits, threshold and trap and trigger configuration) and endpoint indicators (e.g., a particular VRF or domain and/or VLAN for which endpoints need to be probed).

As indicated by block 164, a probe generator 100 may generate, configure and schedule one or more probe packets to be transmitted to the identified endpoints. The probe packets may be generated (see block 166), configured and scheduled based on the instructions obtained by the configuration module 96. The generation of the probe packets may also be dependent on the information obtained from the information base, as the endpoint identifiers are used to transmit the probe packets to the relevant endpoints.

The sender module 102 may transmit, as shown by block 168, the one or more probe packets to the identified endpoints.

As described, the probe packets may be time-stamped before transmission. Once the probe packets are received by a receiver module of the respective endpoints, the endpoints may also time-stamp performance probe packets and may add additional information to the performance probe packets. The performance probe packets are then transmitted by sender modules of the respective endpoints to the apparatus 80.

As shown by block 170, the receiver module 104 may receive the performance probe packets from the various endpoints and the performance management module 92 may then measure the network performance data based on the received performance probe packets (indicated by block 172).

A monitoring module 106 may monitor endpoints and data paths associated with the apparatus 80 (indicated by block 174). The monitoring module 106 monitors (shown by decision block 176) whether an identified endpoint has failed or fallen away or whether a new endpoint conforming to the endpoint indicators has been identified as forming part of the network.

In the event that the apparatus 80 has detected a change, the routing table of the information base 90 may be updated (block 178), which may then generate (block 180), through the processor 82, an update notification which is received by the performance management module 92.

The probe generator may, in response to receiving the update notification and the information in the update notification, adjust the generation, configuration and scheduling of the one or more probe packets to be transmitted to updated endpoints (block 182).

Figure 11:
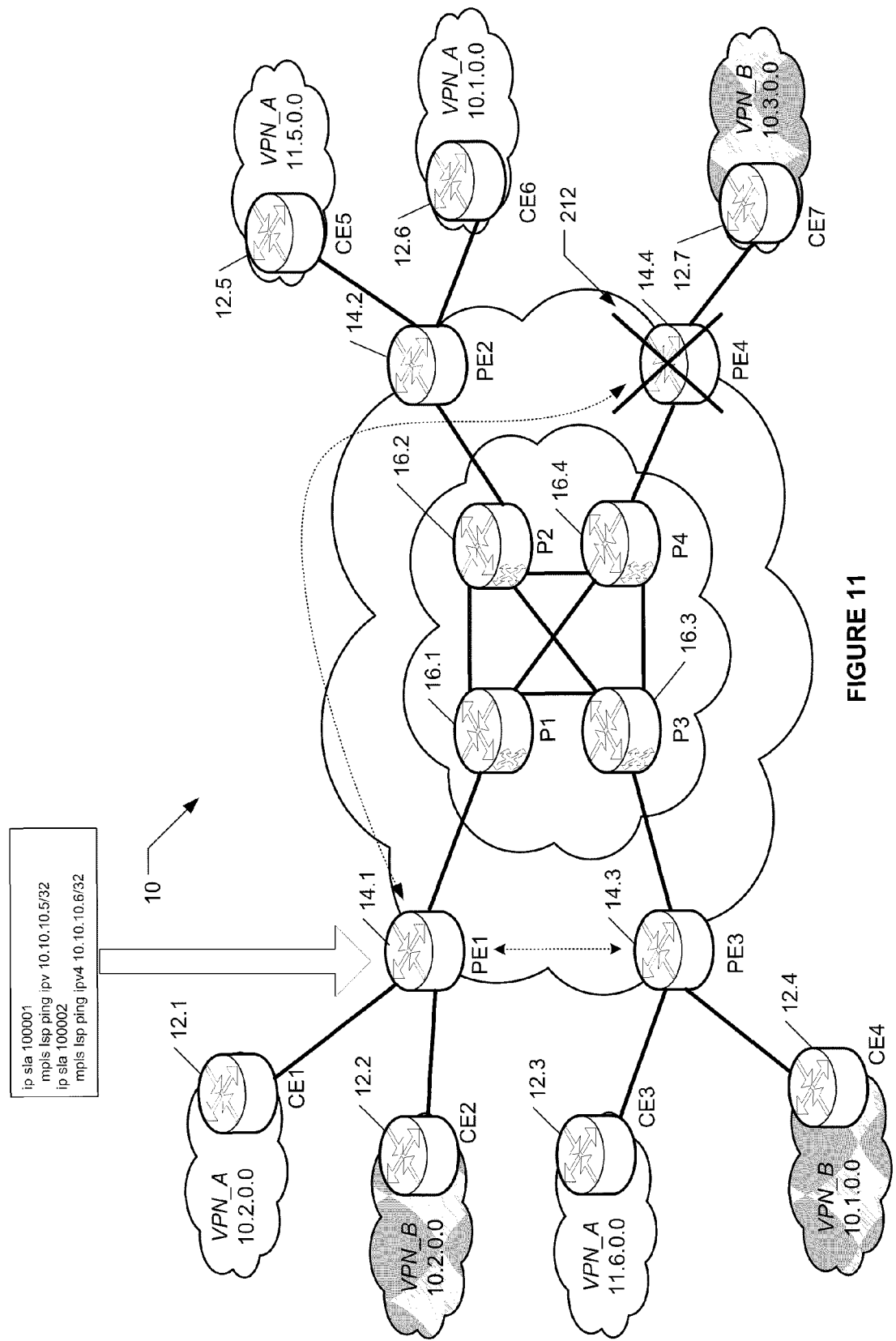
Figure 12:
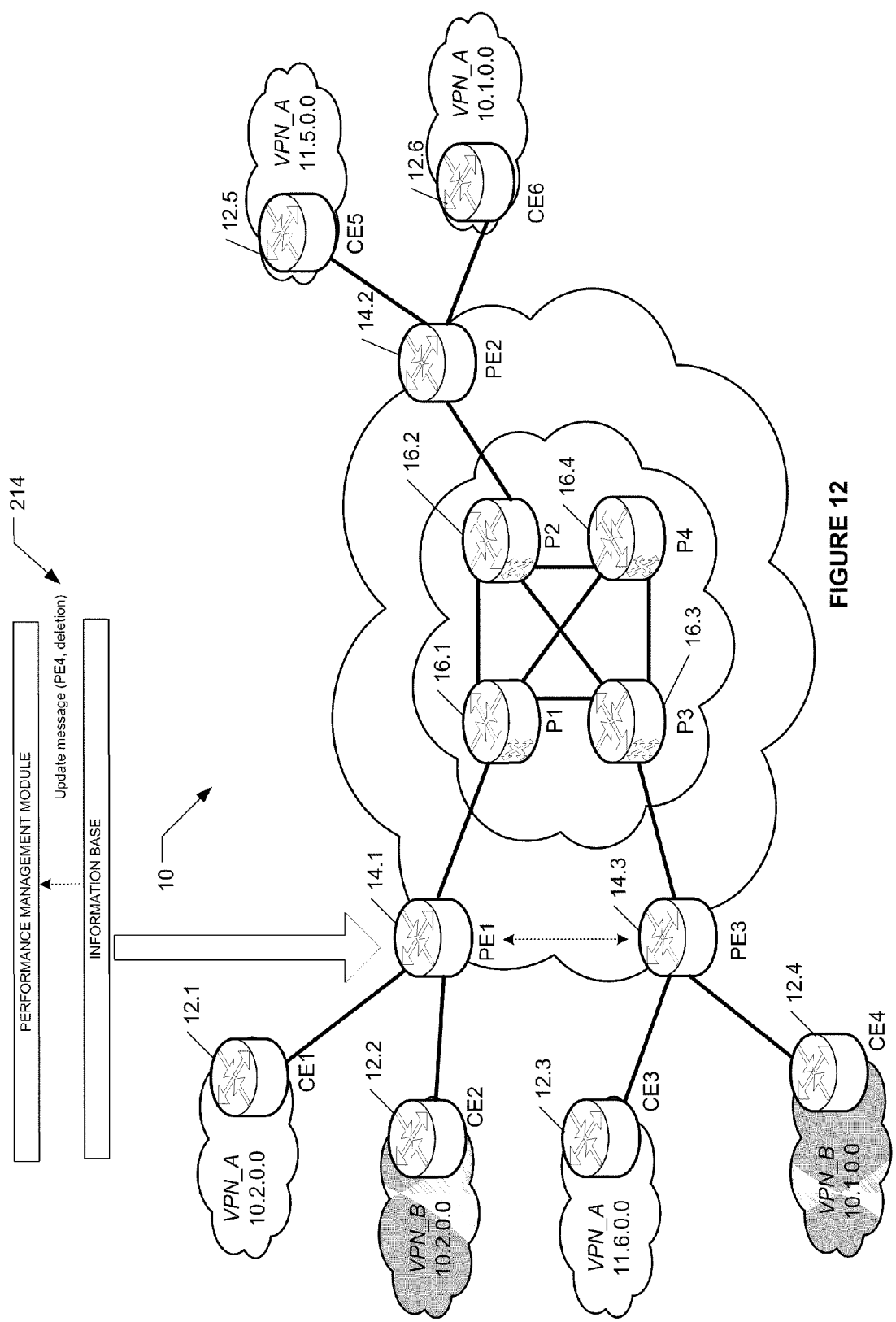

As shown in an example embodiment of FIG. 11, provider edge router PE4 14.4 may have fail (see arrow 212). A ping probe generated by the performance management module 92 may fail as a result of the router failure and may raise a trap. As indicated in an example embodiment of FIG. 12, the information base 90 may then be updated with the deletion and generate an update notification which is communicated to the performance management module 92 to delete provider edge router PE4 14.4, indicated by arrow 214. Thus, upon failure (or addition) of any endpoints in a network, the probe configuration may be automatically updated.

The following examples may show the benefit of the above described automation for proper performance management of networks.

The first example relates to a BGP neighbor in a MPLS VPN network similar to the network shown in FIG. 1.

The following CLI show example MPLS VPN next hop endpoints:

---

PE1# show mpls discovery vpn
Refresh interval set to 1 second.
Next hop 10.10.10.4 (Prefix: 10.10.10.4/32)
   in use by: VPN_A -continued

```
         Next hop 10.10.10.5 (Prefix: 10.10.10.5/32)
            in use by: VPN_A, VPN_B
         Next hop 10.10.10.6 (Prefix: 10.10.10.6/32)
            in use by: VPN_B
```

In order to manually create IP SLAs MPLS LSP Ping probes to each provider edge router of vrf1, the following CLI commands are needed:

```
PE1#conf t
pe(config)#ip sla 1
pe(config-ip-sla)#mpls lsp ping ipv4 10.10.10.4/32
pe(config-sla-monitor-lspPing)#exit
pe(config)#ip sla 2
pe(config-ip-sla)#mpls lsp ping ipv4 10.10.10.5/32
pe(config-sla-monitor-lspPing)#exit
pe(config)#ip sla 3
pe(config-ip-sla)#mpls lsp ping ipv4 10.10.10.6/32
pe(config-sla-monitor-lspPing)#exit
pe(config)#ip sla group schedule 1 1-3 schedule-period 30
    start-time now
```

With the example embodiment method and apparatus of the present disclosure, the above commands may be implemented automatically by the following CLI commands, irrespective of how many provider edge routers or endpoints are involved:

```
pe(config)#auto ip sla mpls-lsp-monitor 100
pe(config-auto-ip-sla-mpls)#type echo vrf VPN_B
pe(config-auto-ip-sla-mpls-params)#exit
pe(config)#auto ip sla mpls-lsp-monitor schedule 100
    schedule-period   30 start-time now
```

In the next example embodiment of manual configuration of an Ethernet OAM example network similar to the network of FIGS. 2 and 3, the following CLI shows example Ethernet remote end points:

```
          sanjose#sh ethernet cfm maintenance-points remote
          Can only Ping/Traceroute to remote MEPs marked with *
```

| MPID | Level Age (sec) | Mac Address Service ID | Vlan PortState | InGressPort |
|---|---|---|---|---|
| 5312* | 3 | aabb.cc00.0510 2 | UP | Et1/0.1 |
|  | 35 | csi_operator_13_1_2 |  |  |
| 6322* | 3 | aabb.cc00.0610 2 | UP | Et1/0.1 |
|  | 35 | csi_operator_13_1_2 |  |  |
| 2302* | 3 | aabb.cc00.0210 2 | UP | Et1/0.1 |
|  | 35 | csi_operator_13_1_2 |  |  |
| 5313* | 3 | aabb.cc00.0510 3 | UP | Et1/0.2 |
|  | 35 | csi_operator_13_1_3 |  |  |
| 6323* | 3 | aabb.cc00.0610 3 | UP | Et1/0.2 |
|  | 35 | csi_operator_13_1_3 |  |  |
| 2303* | 3 | aabb.cc00.0210 3 | UP | Et1/0.2 |
|  | 35 | csi_operator_13_1_3 |  |  |
| 5512* | 5 | aabb.cc00.0510 2 | UP | Et1/0.1 |
|  | 35 | csi_provider_15_1_2 |  |  |
| 6522* | 5 | aabb.cc00.0610 2 | UP | Et1/0.1 |
|  | 35 | csi_provider_15_1_2 |  |  |
| 5513* | 5 | aabb.cc00.0510 3 | UP | Et1/0.2 |
|  | 35 | csi_provider_15_1_3 |  |  |
| 6523* | 5 | aabb.cc00.0610 3 | UP | Et1/0.2 |
|  | 35 | csi_provider_15_1_3 |  |  |

In order to determine whether these endpoints are reachable, a user would have to manually ping or probe each one of them separately. Prior to taking this action, the user needs to obtain more details, for example, the particular domain and VLAN to be probed.

```
sanjose#sh ethernet cfm maintenance-points remote detail
mpid 5312
MAC Address: aabb.cc00.0510
Domain/Level: DOMAIN_OPERATOR_L3_1/3
VLAN: 2
MPID: 5312 (Can ping/traceroute)
Incoming Port: Ethernet1/0.1
CC Lifetime(sec): 150
Age of Last CC Message(sec): 33
Frame Loss: 0%
CC Packet Statistics: 3/0 (Received/Error)
now ping
sanjose#ping ethernet mpid 5312 domain DOMAIN_OPERATOR_L3_1
vlan 2
Type escape sequence to abort.
Sending 5 Ethernet CFM loopback messages, timeout is 2
    seconds.
Success rate is 100 percent (5/5), round-trip min/avg/max = 1/2/4 ms
```

With the example embodiment method and apparatus of the present disclosure, the above commands may be implemented automatically by the following CLI commands, irrespective of how many Ethernet endpoints are involved.

Firstly all remote endpoints in a given domain and VLAN are to be identified:

```
sanjose(config-ip-sla-ethernet-monitor)#type echo domain
    DOMAIN_OPERATOR_L3_1 vlan 2
```

It is then necessary to generate probe packets and schedule their transmission:

```
sanjose(config)#
00:07:00: IP SLAs Auto Ethernet(1):Number of MPIDs discovered =
    3
    << automatically discovers endpoints >>
00:07:00: IP SLAs Auto Ethernet(1):creating probe for domain =
    DOMAIN_OPERATOR_L3_1, vlan = 2, MPID = 5312
    << create probes >>
00:07:00: IP SLAs Auto Ethernet(1):creating probe for domain =
    DOMAIN_OPERATOR_L3_1, vlan = 2, MPID = 6322
00:07:00: IP SLAs Auto Ethernet(1):creating probe for domain =
    DOMAIN_OPERATOR_L3_1, vlan = 2, MPID = 2302
```

The performance statistics, as shown in the example below, may then be provided:

```
sanjose#sh ip sla ethernet-monitor configuration 1
Entry Number : 1
  Modification time     : *15:37:23.795 PST Thu Jul 6 2006
  Operation Type        : echo
  Domain Name           : DOMAIN_OPERATOR_L3_1
  VLAN ID               : 2
  Tag                   :
  Timeout(ms)           : 5000
  Threshold(ms)         : 5000
  Frequency(sec)        : 20
  Operations List       : 100001-100003 << the probes created >>
  Schedule Period(sec)  : 20
  Request size          : 66
  CoS                   : 0
  Start Time            : Start Time already passed
sanjose#sh ip sla statistics 100001
```

```
Round Trip Time (RTT) for    Index 100001
    Latest RTT: 1 ms
    Latest operation start time: *15:39:33.767 PST Thu Jul 6 2006
    Latest operation return code: OK
    RTT Values:
    Number Of RTT: 1
    RTT Min/Avg/Max: 1/1/1 milliseconds << latency stats >>
    Latency One-way Time:
        Number of Latency one-way Samples: 0
        Source to Destination Latency one way Min/Avg/Max: 0/0/0
            milliseconds
        Destination to Source Latency one way Min/Avg/Max: 0/0/0
            millseconds
    Jitter Time:
        Number of Jitter Samples: 0
        Source to Destination Jitter Min/Avg/Max: 0/0/0
            milliseconds
        Destination to Source Jitter Min/Avg/Max: 0/0/0
            milliseconds
    Packet Unprocessed: 0
    Packet Loss Values:
        Loss Source to Destination: 0    Loss Destination to
            Source: 0
        Out Of Sequence: 0    Tail Drop: 0    Packet Late
            Arrival: 0
    Number of successes: 4
    Number of failures: 0
    Operation time to live: Forever
```

Figure 13:
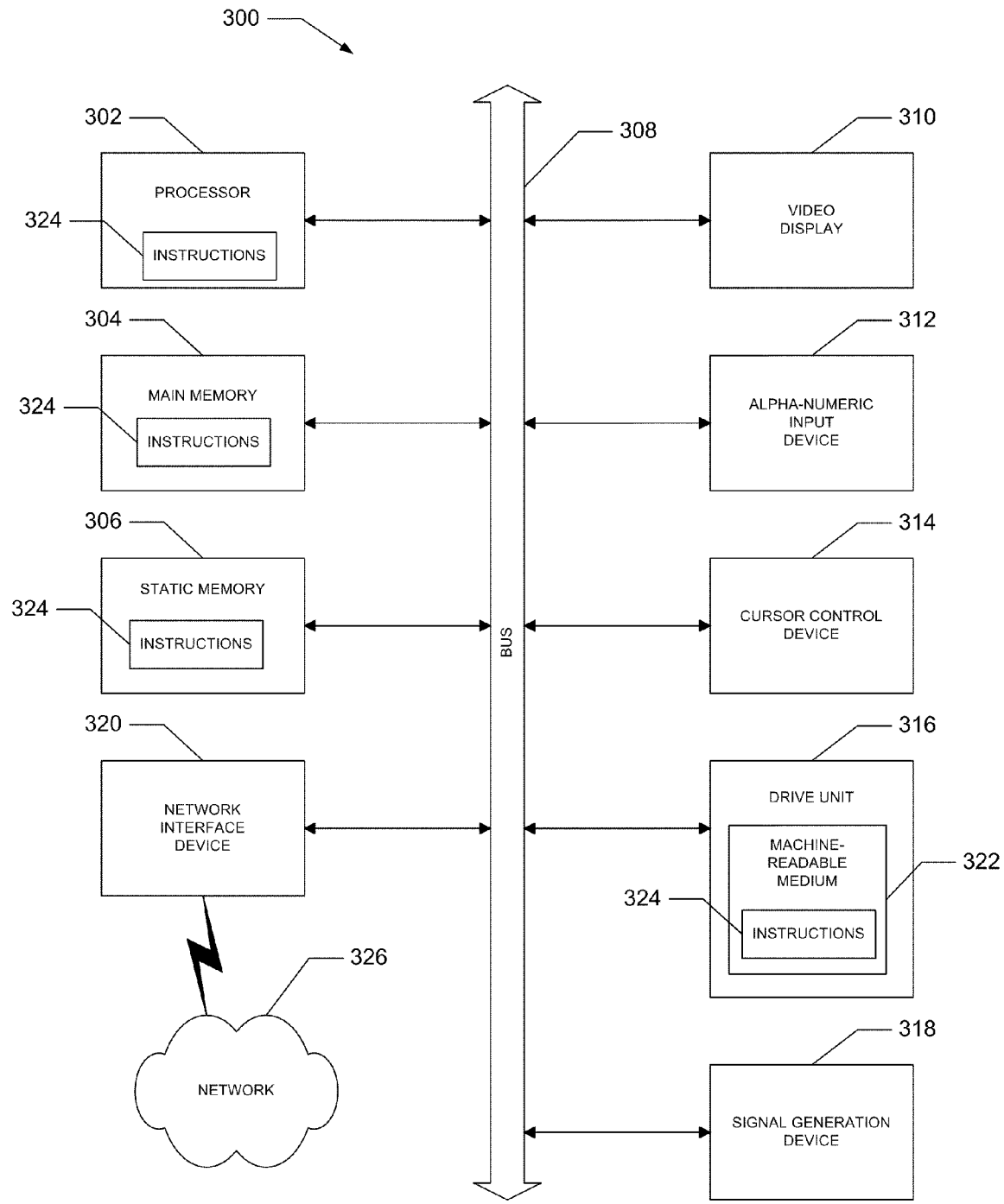
FIG. 13 shows a diagrammatic representation of machine in the example form of a computer system within which a set of instructions, for causing the machine to perform any one or more of the methodologies discussed herein, may be executed.

FIG. 13 shows a diagrammatic representation of machine in the example form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (CPU) or both), a main memory 304 and a static memory 306, which communicate with each other via a bus 308. The computer system 300 may further include a video display unit 310 (e.g., a plasma display, a liquid crystal display (LCD) or a cathode ray tube (CRT)). The computer system 300 also includes an alphanumeric input device 312 (e.g., a keyboard), a user interface (UT) navigation device 314 (e.g., mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an example embodiment to be a single medium, the term "machine-readable medium" should be taken to include single medium or multiple media (e.g., centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    receiving probe characteristics and endpoint indicators, the endpoint indicators identifying at least one routing table stored in an information base and criteria upon which potential endpoints will be judged;
    querying, using the endpoint indicators, the information base to locate at least one routing table corresponding to the at least one routing table identified in the endpoint indicators;
    determining a subset of the plurality of endpoints that conform to the criteria specified in the endpoint indicators;
    generating one or more probe packets with an operation type to be transmitted to each endpoint of the subset, the operation type corresponding to the probe characteristics; and
    automatically scheduling the one or more probe packets to be transmitted to the each endpoint of the subset.

2. The method of claim 1, further comprising transmitting the one or more probe packets based on the scheduling.

3. The method of claim 1, further comprising:
    receiving a performance probe packet from an endpoint; and assessing network performance based on the received performance probe packet.

4. The method of claim 3, wherein the performance probe packet was received from an endpoint that received a transmitted probe packet based on the scheduling, the performance probe packet comprising a time-stamp.

5. The method of claim 1, further comprising:
detecting a change in the network; and
updating the at least one routing table based on the detecting.

6. The method of claim 1, further comprising:
receiving an update notification; and
adjusting the one or more packets to be transmitted to the each endpoint of the subset.

7. The method of claim 6, wherein the update notification indicates that a particular endpoint of the subset is no longer available, the adjusting comprising deleting a scheduled probe to be transmitted to the particular endpoint.

8. The method of claim 6, wherein the update notification indicates that a new endpoint that conforms to the endpoint indicators has been discovered, the adjusting comprising generating a new probe packet to be transmitted to the new endpoint.

9. The method of claim 6, wherein at least one of the scheduling or a configuration of the one or more packets is adjusted.

10. The method of claim 1, further comprising:
configuring the one or more probe packets to be one of an echo type, a pathEcho type, a jitter type, and a pathJitter type.

11. An apparatus comprising:
a configuration module to receive probe characteristics and endpoint indicators, the endpoint indicators identifying at least one routing table stored in an information base and criteria upon which potential endpoints will be judged;
a query module including one or more processors to
    query, using the endpoint indicators, the information base to locate at least one routine table corresponding to the at least one routine table identified in the endpoint indicators, and
    determine a subset of the plurality of endpoints that conform to the criteria specified in the endpoint indicators; and
a probe generator to
    generate one or more probe packets with an operation type to be transmitted to each endpoint of the subset, the operation type corresponding to the probe characteristics, and
    schedule the one or more probe packets to be transmitted to the each endpoint of the subset.

12. The apparatus of claim 11, further comprising:
a sender module to transmit the one or more probe packets based on the scheduling.

13. The apparatus of claim 11, further comprising:
a receiver module to receive a performance probe packet from an endpoint; and
a monitoring module to assess network performance based on the received performance probe packet.

14. The apparatus of claim 13, wherein the performance probe packet was received from an endpoint that received a transmitted probe packet based on the scheduling, the performance probe packet comprising a time-stamp.

15. The apparatus of claim 11, further comprising:
a monitoring module to receive an update notification and adjust the one or more packets to be transmitted to the each endpoint of the subset.

16. The apparatus of claim 15, wherein the update notification indicates that a particular endpoint of the subset is no longer available, the adjusting comprising deleting a scheduled probe to be transmitted to the particular endpoint.

17. The apparatus of claim 15, wherein the update notification indicates that a new endpoint that conforms to the endpoint indicators has been discovered, the adjusting comprising generating a new probe packet to be transmitted to the new endpoint.

18. A non-transitory machine-readable medium comprising instructions that, when executed by a machine, perform operations, the operations comprising:
receiving probe characteristics and endpoint indicators, the endpoint indicators identifying at least one routing table stored in an information base and criteria upon which potential endpoints will be judged;
querying, using the endpoint indicators, the information base to locate at least one routing table corresponding to the at least one routing table identified in the endpoint indicators;
determining a subset of the plurality of endpoints that conform to the criteria specified in the endpoint indicators;
generating one or more probe packets with an operation type to be transmitted to each endpoint of the subset, the operation type corresponding to the probe characteristics; and
automatically scheduling the one or more probe packets to be transmitted to the each endpoint of the subset.

19. The non-transitory machine-readable medium of claim 18, the method further comprising transmitting the one or more probe packets based on the scheduling.

20. The non-transitory machine-readable medium of claim 18, the method further comprising:
receiving a performance probe packet from at an endpoint; and
assessing network performance based on the received performance probe packet.

* * * * *